(12) United States Patent
Plache et al.

(10) Patent No.: US 9,058,032 B2
(45) Date of Patent: *Jun. 16, 2015

(54) HOSTING REQUIREMENTS FOR SERVICES

(75) Inventors: Kenneth Plache, Scottsdale, AZ (US); Daniel B. Seger, III, Kennesaw, GA (US); Raymond Staron, Chagrin Falls, OH (US); Robert J. Kretschmann, Bay Village, OH (US); Taryl Jasper, South Euclid, OH (US); James Harry Jarrett, Baltimore, MD (US); Russell Brandes, Brunswick, OH (US); Ronald Bliss, Twinsburg, OH (US); Michael Kalan, Highland Heights, OH (US); Subbian Govindaraj, Solon, OH (US); Kenwood Hall, Hudson, OH (US); Douglas J. Reichard, Fairview, OH (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 154 days.

This patent is subject to a terminal disclaimer.

(21) Appl. No.: 12/893,366

(22) Filed: Sep. 29, 2010

(65) Prior Publication Data

US 2011/0022626 A1 Jan. 27, 2011

Related U.S. Application Data

(63) Continuation-in-part of application No. 11/536,715, filed on Sep. 29, 2006, now Pat. No. 7,856,279, and a continuation-in-part of application No. 11/536,746, filed on Sep. 29, 2006, now Pat. No. 7,835,805, and a (Continued)

(51) Int. Cl.
*G05B 19/418* (2006.01)
*G05B 19/042* (2006.01)
*G05B 19/05* (2006.01)

(52) U.S. Cl.
CPC ...... *G05B 19/41845* (2013.01); *G05B 19/0426* (2013.01); *G05B 19/056* (2013.01);

(Continued)

(58) Field of Classification Search
CPC .......... G05B 19/0426; G05B 2219/33148; G05B 2219/23389; G05B 2219/31196; G05B 2219/13063; G05B 19/41845; H04L 29/06; H04L 29/08081
USPC ........................................... 709/229
See application file for complete search history.

(56) References Cited

U.S. PATENT DOCUMENTS 5,485,620 A 1/1996 Sadre et al.
5,522,066 A 5/1996 Lu (Continued)

FOREIGN PATENT DOCUMENTS

CN 101201598 A 6/2008
CN 101201599 A 6/2008

(Continued)

OTHER PUBLICATIONS

OA dated Mar. 22, 2011 for U.S. Appl. No. 12/241,319, 23 pages.

(Continued)

*Primary Examiner* — Razu Miah
(74) *Attorney, Agent, or Firm* — Amin, Turocy & Watson, LLP

(57) ABSTRACT

Aspects describe an apparatus, method and system for constructing an application in an industrial automation system. An identification component can receive at least one requirement of the application. Based upon the at least one requirement, the identification component can select at least one service that satisfies the at least one requirement. The at least one service can be associated with at least one operational requirement. The identification component can match at least one host to the at least one service by matching the at least one operational requirement with at least one capability of the at least one service.

20 Claims, 11 Drawing Sheets

Related U.S. Application Data continuation-in-part of application No. 11/536,760, filed on Sep. 29, 2006, now Pat. No. 7,912,560, and a continuation-in-part of application No. 11/536,791, filed on Sep. 29, 2006, now abandoned, and a continuation-in-part of application No. 12/241,319, filed on Sep. 30, 2008, now Pat. No. 8,818,757, and a continuation-in-part of application No. 12/241,327, filed on Sep. 30, 2008, now Pat. No. 8,265,775, and a continuation-in-part of application No. 12/241,342, filed on Sep. 30, 2008, now Pat. No. 8,041,435.

(52) U.S. Cl.
CPC ............... *G05B2219/13063* (2013.01); *G05B 2219/23389* (2013.01); *G05B 2219/31196* (2013.01); *G05B 2219/33148* (2013.01)

(56) References Cited

U.S. PATENT DOCUMENTS

| | | | |
|---|---|---|---|
| 5,530,861 A | 6/1996 | Diamant et al. | |
| 5,812,394 A | 9/1998 | Lewis et al. | |
| 5,907,704 A | 5/1999 | Gudmundson et al. | |
| 5,946,681 A | 8/1999 | Shorter | |
| 6,067,299 A | 5/2000 | DuRee | |
| 6,085,222 A | 7/2000 | Fujino et al. | |
| 6,104,962 A * | 8/2000 | Sastry | 700/86 |
| 6,154,684 A | 11/2000 | Schwenke et al. | |
| 6,167,383 A | 12/2000 | Henson | |
| 6,269,254 B1 | 7/2001 | Mathis | |
| 6,437,805 B1 | 8/2002 | Sojoodi et al. | |
| 6,477,435 B1 | 11/2002 | Ryan | |
| 6,505,247 B1 * | 1/2003 | Steger et al. | 709/224 |
| 6,539,271 B2 | 3/2003 | Lech et al. | |
| 6,553,268 B1 | 4/2003 | Schwenke et al. | |
| 6,615,166 B1 | 9/2003 | Guheen et al. | |
| 6,618,856 B2 | 9/2003 | Coburn et al. | |
| 6,718,533 B1 | 4/2004 | Schneider et al. | |
| 6,868,538 B1 | 3/2005 | Nixon et al. | |
| 7,016,759 B2 | 3/2006 | Kaever et al. | |
| 7,020,697 B1 * | 3/2006 | Goodman et al. | 709/223 |
| 7,043,311 B2 | 5/2006 | Nixon et al. | |
| 7,058,712 B1 * | 6/2006 | Vasko et al. | 709/224 |
| 7,080,066 B1 | 7/2006 | Scheurich et al. | |
| 7,089,530 B1 | 8/2006 | Dardinski et al. | |
| 7,096,465 B1 | 8/2006 | Dardinski et al. | |
| 7,146,232 B2 | 12/2006 | Staron et al. | |
| 7,159,007 B2 * | 1/2007 | Stawikowski | 709/202 |
| 7,194,446 B1 | 3/2007 | Bromley et al. | |
| 7,197,493 B2 | 3/2007 | Ashby et al. | |
| 7,225,037 B2 | 5/2007 | Shani | |
| 7,233,830 B1 | 6/2007 | Callaghan | |
| 7,266,677 B1 | 9/2007 | Bromley et al. | |
| 7,272,815 B1 | 9/2007 | Eldridge et al. | |
| 7,363,338 B2 | 4/2008 | Kaakani et al. | |
| 7,395,122 B2 | 7/2008 | Kreidler et al. | |
| 7,418,305 B2 | 8/2008 | Buesgen et al. | |
| 7,505,817 B2 | 3/2009 | McDaniel et al. | |
| 7,509,249 B2 | 3/2009 | Britt et al. | |
| 7,627,385 B2 | 12/2009 | McGreevy et al. | |
| 7,653,008 B2 | 1/2010 | Patrick et al. | |
| 7,676,279 B2 * | 3/2010 | Hood et al. | 700/17 |
| 7,970,830 B2 * | 6/2011 | Staggs et al. | 709/205 |
| 7,979,488 B2 * | 7/2011 | Thibault et al. | 709/203 |
| 8,214,455 B2 * | 7/2012 | Baier et al. | 709/217 |
| 2001/0034557 A1 | 10/2001 | Hudson et al. | |
| 2001/0052113 A1 | 12/2001 | Hearne et al. | |
| 2002/0059272 A1 | 5/2002 | Porter | |
| 2002/0156548 A1 * | 10/2002 | Arackaparambil et al. | 700/108 |
| 2002/0184304 A1 * | 12/2002 | Meade et al. | 709/203 |
| 2003/0023336 A1 * | 1/2003 | Kreidler et al. | 700/108 |
| 2003/0045950 A1 | 3/2003 | Bronikowski et al. | |
| 2003/0061274 A1 * | 3/2003 | Lo | 709/203 |
| 2003/0150927 A1 | 8/2003 | Rosen | |
| 2003/0163656 A1 | 8/2003 | Ganton | |
| 2004/0015568 A1 | 1/2004 | Kaakani et al. | |
| 2004/0122908 A1 * | 6/2004 | Konopka et al. | 709/208 |
| 2004/0139427 A1 | 7/2004 | Garvey | |
| 2004/0199925 A1 | 10/2004 | Nixon et al. | |
| 2004/0230328 A1 | 11/2004 | Armstrong et al. | |
| 2004/0230643 A1 * | 11/2004 | Thibault et al. | 709/201 |
| 2004/0230944 A1 * | 11/2004 | Murphy et al. | 717/105 |
| 2005/0021885 A1 * | 1/2005 | Anderson et al. | 710/29 |
| 2005/0027831 A1 | 2/2005 | Anderson et al. | |
| 2005/0080788 A1 | 4/2005 | Murata | |
| 2005/0125735 A1 | 6/2005 | Cohen et al. | |
| 2005/0132064 A1 * | 6/2005 | Lo | 709/227 |
| 2005/0135390 A1 * | 6/2005 | Anderson et al. | 370/401 |
| 2005/0144225 A1 * | 6/2005 | Anderson et al. | 709/203 |
| 2005/0229004 A1 | 10/2005 | Callaghan | |
| 2005/0234873 A1 | 10/2005 | Milligan | |
| 2005/0256735 A1 | 11/2005 | Bayne | |
| 2006/0031855 A1 | 2/2006 | Smithline | |
| 2006/0037008 A1 | 2/2006 | Stelzer et al. | |
| 2006/0059127 A1 | 3/2006 | Berry et al. | |
| 2006/0179032 A1 | 8/2006 | Gottsman et al. | |
| 2006/0206448 A1 | 9/2006 | Hyder et al. | |
| 2006/0212146 A1 | 9/2006 | Johnson et al. | |
| 2006/0259954 A1 | 11/2006 | Patrick et al. | |
| 2006/0271505 A1 | 11/2006 | Vierich et al. | |
| 2006/0277289 A1 * | 12/2006 | Bayliss et al. | 709/223 |
| 2007/0011281 A1 | 1/2007 | Jhoney et al. | |
| 2007/0055757 A1 | 3/2007 | Mairs et al. | |
| 2007/0073850 A1 | 3/2007 | Callaghan et al. | |
| 2007/0089063 A1 | 4/2007 | Breyer | |
| 2007/0124475 A1 | 5/2007 | Syed et al. | |
| 2007/0142941 A1 | 6/2007 | McGreevy et al. | |
| 2007/0250630 A1 | 10/2007 | Blanding | |
| 2007/0256051 A1 | 11/2007 | Rojer | |
| 2008/0022151 A1 | 1/2008 | Stange et al. | |
| 2008/0040477 A1 | 2/2008 | Johnson et al. | |
| 2008/0079558 A1 | 4/2008 | Dorgelo et al. | |
| 2008/0082186 A1 | 4/2008 | Hood et al. | |
| 2008/0082577 A1 | 4/2008 | Hood | |
| 2008/0082636 A1 | 4/2008 | Hofmann et al. | |
| 2008/0082959 A1 | 4/2008 | Fowler et al. | |
| 2008/0092131 A1 * | 4/2008 | McIntyre et al. | 717/172 |
| 2008/0120367 A1 * | 5/2008 | Thibault et al. | 709/203 |
| 2008/0127065 A1 | 5/2008 | Bryant et al. | |
| 2008/0133700 A1 * | 6/2008 | Thibault et al. | 709/217 |
| 2008/0140230 A1 | 6/2008 | Bromley | |
| 2008/0201297 A1 | 8/2008 | Choi et al. | |
| 2008/0208361 A1 | 8/2008 | Grgic | |
| 2008/0208368 A1 * | 8/2008 | Grgic | 700/20 |
| 2008/0222276 A1 * | 9/2008 | Thibault et al. | 709/220 |
| 2008/0284649 A1 | 11/2008 | Bratthall et al. | |
| 2009/0083705 A1 | 3/2009 | Phillips et al. | |
| 2009/0083843 A1 | 3/2009 | Wilkinson et al. | |
| 2009/0094326 A1 * | 4/2009 | Thibault et al. | 709/203 |
| 2009/0328012 A1 | 12/2009 | Aharoni et al. | |
| 2010/0058366 A1 * | 3/2010 | Swildens | 719/329 |
| 2010/0088104 A1 | 4/2010 | DeRemer et al. | |
| 2010/0095109 A1 * | 4/2010 | McColgan et al. | 713/151 |
| 2010/0192125 A1 | 7/2010 | Son et al. | |

FOREIGN PATENT DOCUMENTS

| | | |
|---|---|---|
| DE | 19614789 C1 | 9/1997 |
| DE | 101 29 564 A1 | 9/2002 |
| EP | 1276026 A | 1/2003 |
| EP | 1422619 A | 5/2004 |
| EP | 1 772 785 A | 4/2007 |
| EP | 1 906 276 A2 | 4/2008 |
| EP | 1 936 496 A1 | 6/2008 |
| EP | 1 906 276 A3 | 12/2009 |
| EP | 2 169 597 A1 | 3/2010 |
| EP | 2 169 598 A1 | 3/2010 |
| EP | 2 169 599 A1 | 3/2010 |
| WO | 0195041 A1 | 12/2001 |

(56) References Cited

FOREIGN PATENT DOCUMENTS

| WO | 02/31607 A | 4/2002 |
|---|---|---|
| WO | 2004086160 A1 | 10/2004 |

OTHER PUBLICATIONS

OA dated Feb. 24, 2011 for U.S. Appl. No. 12/241,342, 35 pages.
OA dated May 10, 2011 for U.S. Appl. No. 11/536,791, 46 pages.
European Search Report for European Patent Application No. EP07117140, dated May 7, 2008, 8 pages.
Sweet, et al. Managing Technology Change in Industrial Automation. Proceedings of the Third IEEE Conference on Control Applications, Aug. 24-26, 1994, pp. 3-6, vol. 1. An ABB Overview of Research Priorities.
Maaref, et al. Communication System for Industrial Automation, Proceedings of the IEEE International Symposium on Industrial Electronics, Jul. 7-11, 1997. Laboratoire Logiciels System Reseaux-Image, IEEE, pp. 1286-1291.
OA Dated Oct. 6, 2008 for U.S. Appl. No. 11/536,715, 23 pages.
OA Dated Oct. 29, 2008 for U.S. Appl. No. 11/536,746, 23 pages.
OA Dated Oct. 29, 2008 for U.S. Appl. No. 11/536,791, 43 pages.
OA Dated Oct. 7, 2008 for U.S. Appl. No. 11/536,760, 33 pages.
OA Dated Jan. 9, 2009 for U.S. Appl. No. 11/536,827, 18 pages.
OA dated Apr. 13, 2009 for U.S. Appl. No. 11/536,746, 23 pages.
OA dated Mar. 24, 2009 for U.S. Appl. No. 11/536,715, 38 pages.
OA dated Apr. 23, 2009 for U.S. Appl. No. 11/536,760, 22 pages.
OA dated Apr. 17, 2009 for U.S. Appl. No. 11/536,791, 37 pages.
OA dated Aug. 24, 2009 for U.S. Appl. No. 11/536,746, 18 pages.
OA dated Aug. 21, 2009 for U.S. Appl. No. 11/536,760, 17 pages.
OA dated Aug. 6, 2009 for U.S. Appl. No. 11/536,791, 38 pages.
OA dated Jun. 23, 2009 for U.S. Appl. No. 11/536,827, 22 pages.
OA dated Oct. 20, 2009 for U.S. Appl. No. 11/536,715, 41 pages.
European Search Report dated Nov. 20, 2009 for European Application No. EP 07 11 7192, 9 pages.
"Simatic, Working with Step V5.1, Edition Aug. 2000, A5E00069681-03". Aug. 2000, Siemens, D-90327, Nurnberg, DE, XP002554626.
Fayad, et al. "HMI as a Maintainance tool." Advances in Instrumentation and Control, Instrument Society of America, Research Triangle Park, US, vol. 2, part 1, Jan. 1, 1998, pp. 119-134, XP000875207, ISSN: 1054-0032, p. 124, last paragraph-p. 133, last paragraph.
OA dated Jan. 26, 2010 for U.S. Appl. No. 11/536,791, 39 pages.
OA dated Mar. 8, 2010 for U.S. Appl. No. 11/536,760, 19 pages.
OA dated Mar. 8, 2010 for U.S. Appl. No. 11/536,746, 21 pages.
Raymond Staron, et al. Use of an Agent Type Library for the Design and Implementation of Highly Flexible Control Systems. Last accessed on Oct. 10, 2008, 6 pages.
Marvin J. Schwenke, et al. Specifying a Control Program with High Level Graphical Editors. (c) 2001 Society of Automotive Engineers, Inc. Last accessed on Oct. 10, 2008, 9 pages.
Marvin J. Schwenke, et al. Use of a Type Library to Speed Up PLC Program Design and Commissioning. Last accessed on Oct. 10, 2008, 13 pages.
European Search Report for European Application No. 09171807.2-1238 dated Feb. 4, 2008, 7 pages.
European Search Report on European Patent Application No. EP09171802.3-1238, dated Jan. 29, 2010, 6 pages.
European Search Report for European Application No. 09171806.4-1238 dated Apr. 2, 2010, 8 pages.
European Search Report dated Jan. 25, 2010 for European Application No. EP09171807, 2 pages.
OA dated May 14, 2010 for U.S. Appl. No. 11/536,715, 49 pages.
"Datastream 7i for SQL Server"; Jun. 13, 2006, Infor, 2 pages.
European Search Report Dated Jan. 21, 2010 for European Application No. EP09171802, 2 pages.
European Search Report Dated Jan. 27, 2010 for European Application No. EP09171806, 2 pages.
OA dated Sep. 17, 2010 for U.S. Appl. No. 12/241,319, 32 pages.
OA dated Jan. 25, 2012 for U.S. Appl. No. 12/241,327, 45 pages.
OA dated Oct. 24, 2011 for U.S. Appl. No. 11/536,791, 35 pages.
OA dated Dec. 16, 2010 for U.S. Appl. No. 11/536,818, 50 pages.
Article entitled "Viewanyware solutions from Rockwell Automation", by SAIMC, dated May 2001.
Article entitled "Automation Today", by Rockwell, dated Feb. 2001.
Article entitled "ViewAnyWare" by Rockwell, dated Jun. 10, 2004.
Article entitled "ViewAnyWare: Picture the Reaility" by Rockwell, Copyright 2004.
Final Office Action dated Sep. 4, 2014 for U.S. Appl. No. 12/893,883, 31 pages.

* cited by examiner

HOSTING REQUIREMENTS FOR SERVICES

CROSS-REFERENCE TO RELATED APPLICATIONS

This application is a Continuation-in-Part of co-pending U.S. patent application Ser. No. 11/536,715, entitled "MODULE STRUCTURE AND USE FOR INDUSTRIAL CONTROL SYSTEMS," filed on Sep. 29, 2006; this application is also a Continuation-in-Part of co-pending U.S. patent application Ser. No. 11/536,746, entitled "HMI VIEWS OF MODULES FOR INDUSTRIAL CONTROL SYSTEMS," filed on Sep. 29, 2006; this application is also a Continuation-in-Part of co-pending U.S. patent application Ser. No. 11/536,760, entitled "MODULE AND CONTROLLER OPERATION FOR INDUSTRIAL CONTROL SYSTEMS," filed on Sep. 29, 2006; this application is also a Continuation-in-Part of co-pending U.S. patent application Ser. No. 11/536,791, entitled "MODULE CLASSIFICATION AND SEARCHING FOR INDUSTRIAL CONTROL SYSTEMS," filed on Sep. 29, 2006; this application is also a Continuation-in-Part of co-pending U.S. patent application Ser. No. 12/241,319, entitled "MODULE AND HOST MATCHING," filed on Sep. 30, 2008; this application is also a Continuation-in-Part of co-pending U.S. patent application Ser. No. 12/241,327, entitled "MODULE PUBLICATION AND DISCOVERY," filed on Sep. 30, 2008; this application is also a Continuation-in-Part of co-pending U.S. patent application Ser. No. 12/241,342, entitled "MODULE DYNAMIC HOSTING," filed on Sep. 30, 2008, the entireties of which are incorporated herein by reference.

TECHNICAL FIELD

The following description relates generally to industrial control systems and more particularly to modular automation within industrial control systems.

BACKGROUND

Industrial control systems can employ complex mechanical, electronic, electro-mechanical, and/or robotic machinery to perform various automated mechanical and/or electrical functions. Examples of machinery include industrial motors, pumps, conveyors, escalators, drills, refrigeration systems, and so forth. An industrial control system can utilize one or more control devices to activate or deactivate the machinery and/or to determine an appropriate level of activation for the machinery (e.g., an amount of current to supply to a variable input motor). Additionally, the control devices can be associated with logical program code that determines an appropriate time, degree, manner, and other criteria for operation of the machinery. For example, the determination can be based on various circumstances, including an output of another device, a reading of an optical sensor, an electronic measurement, a movement, a number of rotations of a device, and so on.

The machinery can be controlled by at least one industrial controller, such as, for example, programmable logic controllers. The industrial controllers can also communicate with higher level computing systems or servers that aggregate data from the controllers and help to manage day-to-day activities of an enterprise. As systems have become more complex, however, communications and functional cooperation between components of the industrial automation system has become a challenge. For instance, when users purchase multiple products from one or more vendors, there is often limited interoperability and consistency between such products. Software and control engineers must then learn each product and how the components interact with each other. Limited product and component consistency suggest that techniques engineers learn for one product do not necessarily carry over to other implementations.

Often, integration of products in the industrial automation system is complex and difficult to manage. Process and control engineers cannot easily code and configure their respective components without concern for other system components, which may have different manufacturers and different platforms.

Another problem with integration of products is that process and control engineers focus on underlying technical details, including implementation and glue logic, rather than the application level concerns, for example process information. For instance, an engineer may decide to automate a manual section of their plant. The design may start at a high level but soon becomes a series of discussions regarding nonfunctional requirements e.g., distributed component object model (DCOM), transmission control protocol (TCP), transaction rates, and the like. While these nonfunctional requirements are important, the design of functional requirements is where the true value is to the designer or end user. Thus, the engineer would prefer to focus on functional requirements (equipment control, product flow control, and so forth) providing direct improvements in value rather than dealing with superfluous technology issues.

In another case, system design does not sufficiently enable trade-offs between overhead burden (memory footprint, CPU cycles, and so forth) and application coupling. For instance, processing load should be distributed across the system in accordance with system capabilities. Thus, if one part of the system is shut down, alternative processing capability should be in place to allow production to continue. For example, control and process engineers can initially design and install a control system suiting their immediate needs. Current solutions however do not facilitate a smooth and uncomplicated transition for the respective changes. Multiple technologies underneath many vendors' products complicate configuration and management of systems. This is also aggravated when third party systems are involved. Such complexity hinders the system's capacity to provide higher-level information and can reduce the ability to configure such systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect is an apparatus for an industrial automation system. The apparatus comprises a memory that stores a plurality of services that execute as a plurality of functions in the industrial automation environment. Each of the plurality of services is associated with at least one operational requirement. The apparatus also comprises an identification component. The identification component is stored in memory and executed by a processor. The identification component receives at least one feature of an application in the industrial automation system. In response, the identification component searches the directory for at least one service that can satisfy the at least one feature. The at least one service comprises at least one operational requirement. The identification component matches the at least one service to at least one host by matching at least one capability of the at least one host to the at least one operational requirement of the service.

According to an aspect is a method for constructing an application in an industrial automation environment. The method comprises receiving a description of an application for the industrial automation environment. The description of the application comprises at least one feature of the application. The method also comprises identifying at least one of a plurality of services that satisfies the at least one feature. The service comprises at least one operational requirement. The method also comprises matching the service with at least one host by matching the at least one operational requirement to at least one capability of the host.

According to an aspect is an industrial automation system. The system comprises a plurality of services stored in memory. Each of the plurality of services is associated with at least one operational requirement. The system also comprises an identification component stored in memory and executed by a processor. The identification component is configured to receive at least one feature of an application to be used in the in the industrial automation system. In response, the identification component identifies at least one service that meets the feature. The at least one service comprises at least one operational requirement that corresponds to the feature of the application. The identification component matches at least one of a plurality of hosts to the at least one service. The at least one of the plurality of hosts comprises at least one capability meeting the at least one of the plurality of operational requirements.

To the accomplishment of the foregoing and related ends, one or more aspects comprise features hereinafter fully described. The following description and annexed drawings set forth in detail certain illustrative features of one or more aspects. These features are indicative, however, of but a few of various ways in which principles of various aspects may be employed. Other advantages and novel features will become apparent from the following detailed description when considered in conjunction with the drawings and the disclosed aspects are intended to include all such aspects and their equivalents.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component," "module," "object", "service," "system," "interface," or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

Figure 1:
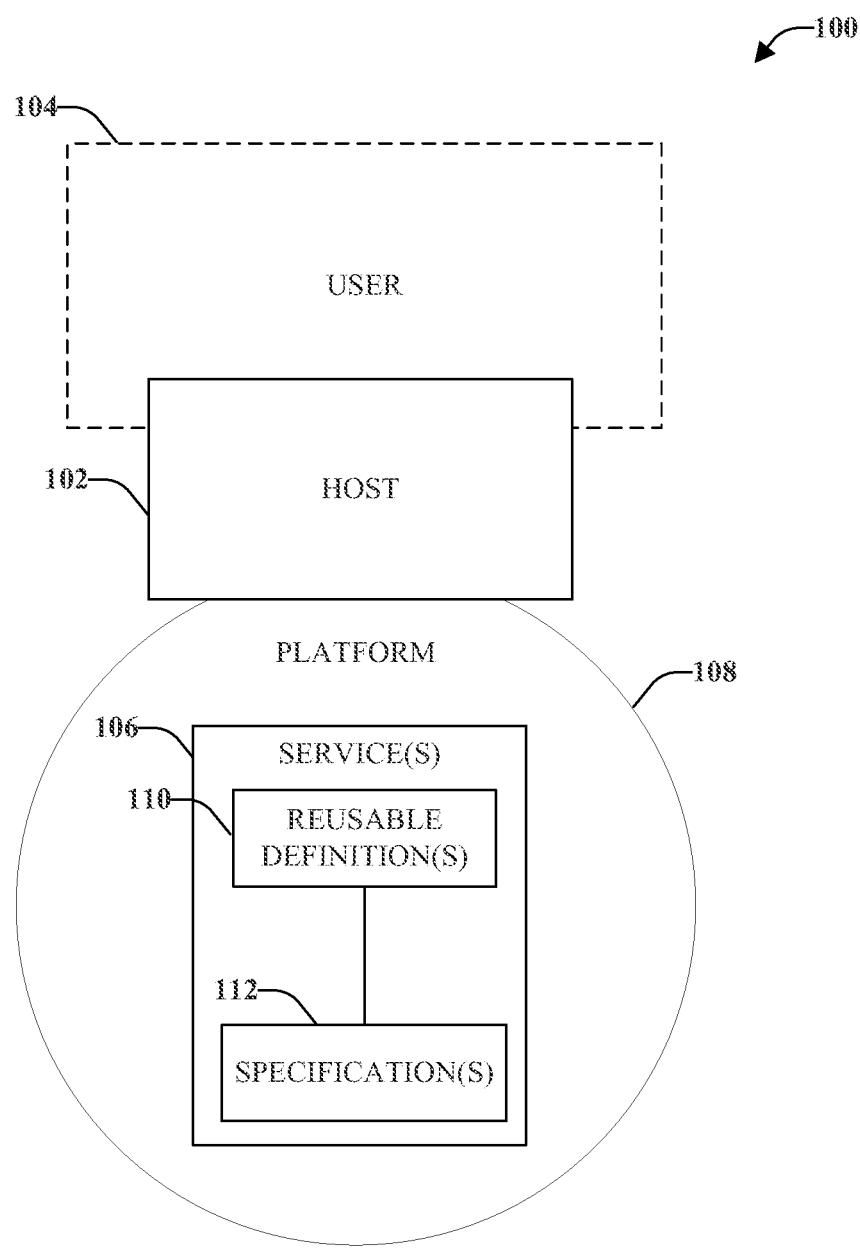
FIG. 1 is a block diagram illustrating interaction of a service and a host in an industrial automation system.

Referring initially to FIG. 1, illustrated is an exemplary industrial automation system 100, according to an aspect. The industrial automation system 100 is configured to utilize modular automation to construct applications with reusable software that exposes functionality of components of the industrial automation system 100, while providing an abstraction from details of communication and interaction with such components.

The industrial automation system 100 includes a host 102 that is configured to interface with a user and/or entities (e.g., the Internet, another system, a computer, and so forth), hereinafter referred to as user 104. The interface between host 102 and user 104 can be through various interface mechanisms, including a human machine interface (HMI) or a graphical user interface (GUI). Although only a single host 102 is illustrated, industrial automation system 100 can include two or more hosts, according to an aspect. According to some aspects, the host 102 can be one or more industrial controllers (e.g., programmable automation controller (PAC), programmable logic controller (PLC), and so forth). The one or more industrial controllers can be associated with one or more human machine interfaces (HMIs). The term "industrial controller" as utilized herein can include functionality that can be shared across multiple components or networks.

The host 102 need not be limited to an industrial controller. According to some aspects, the host 102 can be (or can be associated with) one or more computer or network components within the industrial automation system 100. For example, the host 102 can be a computer, a server, a client, an industrial module, a human machine interface (HMI), a graphical user interface (GUI), and so forth.

The host 102 can be configured to execute at least one service 106 based, at least in part, on input from the user 104. The service 106 is illustrated as contained within a platform 108, which can provide an interface between the host 102 and the service 106. For example, the service 106 can be an executable function for the industrial automation system 100 executed on a platform 108 of the host 102. The platform 108 can be any type of hardware, software or combination of hardware and software that allows the service 106 to run and/or execute. For example, the platform 108 can include one or more of a computer's architecture, an operating system, one or more programming languages, or user interfaces.

The service 106 can be employed as one or more executable functions for the industrial automation system 100. In accordance with some aspects, the service 106 is a reusable template that can be utilized in the development of software for the industrial automation system 100. The software can include, for example, control programs for physical manufacturing unit operations, such as assembly applications. The physical manufacturing unit can include, for example, conveyors, mixers, packaging units, process skids, robotic cells, tanks, valve matrices, and so forth. Additionally or alternatively, the software can include higher-level programs, such as batch processing applications, supervisory applications, monitoring applications, or control programs that control aspects of the industrial automation system 100.

According to some aspects, the service 106 can include one or more module objects, encapsulated objects, control objects, and so on. The service 106 can be configured to facilitate software development by hiding internal interfaces, messages, programming code, and so forth from the user 104 while providing standard and/or generic external interface(s). In accordance with some aspects, the service 106 can simplify programming in the industrial automation system 100 by allowing the user 104 (e.g., a process and control engineer) to work with published functionality of the service 106, which can be independent of how the functionality was achieved, which can mitigate integration and maintenance requirements and reduce costs. This can increase quality, consistency, and reusability of the software by providing a standardized programming structure between various components or hosts 102 (e.g., from different manufacturers) within the industrial automation system 100.

For example, utilizing services 106 can benefit both software developers and end users. For example, utilization of services can allow a developer of control applications to concentrate on the functionality of an application rather than the mechanics of implementation, such as by separating procedure control and equipment control. Services 106 can facilitate continuous software improvements; at the same time, services 106 can mitigate the risks that changes to the software may present to the industrial automation system 100. Utilization of services, as disclosed herein can simplify testing of software, and can provide a reduced chance that new software adversely affects other components or hosts 102 within the industrial automation system 100. This can also reduce development time, accelerate design cycles, and reduce cost. Services 106 can also allow end users (e.g. manufacturers) to separate procedural control and equipment control, which can allow end users to adopt existing assets to new product requirements with minimal time and capital investment.

According to various aspects, the service 106 can separate procedure control and equipment control by employing a hierarchically structured data model (e.g., a hierarchically structured data model according to the International Society for Automation (ISA)-88 standards). In such a manner, procedure control can be logically separated from equipment control. Logical separation can enable the separation of product-specific definitions, instructions, and information from processing equipment entities.

The service 106 can be configured to hide internal aspects from a user 104. For example, the service 106 (and/or platform 108) can include or can be associated with an interface. In accordance with some aspects, the interface can be located within the host 102. The interface can hide internal functions of the service 106, including the underlying code and complexity. According to an embodiment, the interface can define external behaviors supplied to at least one client application engaging the service 106. Through the interface, the service 106 can expose data, expose operations that can be performed, expose dependencies on other services, and so forth. The interface can allow the service 106 to connect to at least one other service to engage with a client application, according to an aspect. For example, an industrial process can be defined with a plurality of services, wherein a first service is a control service that controls a second service (e.g., equipment service) and a third service (e.g., material service), wherein the third service is subordinate to the second service. It is to be appreciated that the service 106 can support more than one interface (e.g., to engage with more than one client application). For example, separating a service 106 between multiple interfaces can allow one interface to be extended and/or changed without impacting other interface areas. This can reduce the overall impact to areas that use the unchanged interface, but not the changed interface.

The interface can hide internal functions of the service 106. These internal functions can include one or more reusable definitions 110 and one or more specifications 112. In accordance with some aspects, the service 106 can be an association of one or more reusable definitions 110 with one or more specifications 112. The one or more reusable definitions 110 can include program code that can alter the state of one or more resources in an industrial automation system (e.g., logic code that can control opening and closing of a valve). The one or more reusable definitions 110 can include programming code, for example, ladder logic, function chart, script, JAVA, C code, and so on. The one or more specifications 112 can include the one or more resources. The one or more resources can include one or more of equipment, material, personnel, segments, storage, and so forth. For example, the resource may be a valve that is opened or closed according to logic code.

In accordance with some aspects, the programming code of the reusable definition 110 can be in a different physical location from the resource of the specification 112 within an enterprise resource control (ERC) system. It is to be appreciated that the service 106 can support more than one reusable definition 110. According to some aspects, different reusable definitions 110 can be targeted for different hosts such that a service 106 with more than one reusable definition 110 can be deployed to more than one host 102 where each host may have different computing capabilities and methods.

The service 106 can include external references (not illustrated) that can maintain metadata pertaining to the service 106, according to an aspect. For example, the external references can include information that describes dependencies of the service 106, required dependencies to support the reusable definitions 110 (e.g., operational requirements). The external references can also include, for example, specific qualities (e.g., performance, reliability, physical characteristics) of the service 106 and/or security aspects of the service 106. The service 106 may also include other portions (not shown), such as local data, visualization elements, etc. Alternatively, a service 106 may be more limited in nature (e.g., only including a single specification 112).

Figure 2:
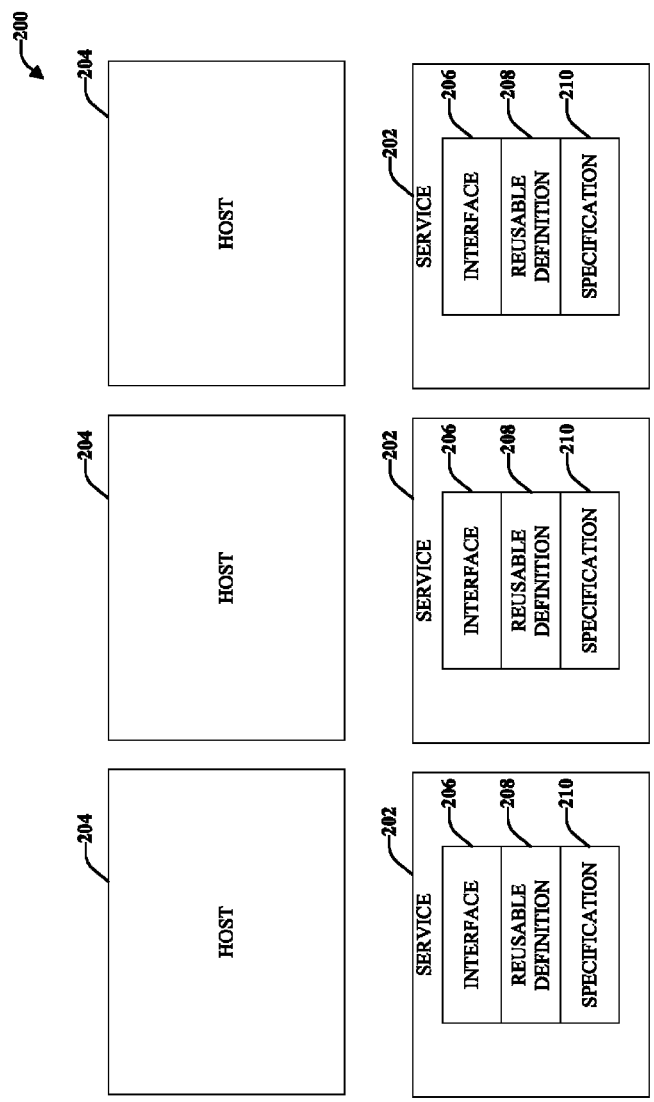
FIG. 2 is a block diagram illustrating a system that utilizes services and hosts.

FIG. 2 illustrates an example system 200, according to an aspect. System 200 can be a portion of an industrial control configuration of an industrial automation system. Included in system 200 are services 202 (e.g., modular objects, encapsulated objects, control objects, etc.) that can exist in conjunction with a one or more hosts 204 upon an industrial control configuration. For example, the services 202 can exist in conjunction with the hosts 204 through an interface 206. Functionality related to the services 202 can be similar to plug-in approaches in software. For example, services 202 can be connected to control a process in the industrial control environment. Services 202 can be customizable and reusable, for example, among multiple users, multiple locations, multiple platforms, and/or multiple hosts 204.

The services 202 can grow into different layers of an organizational hierarchy to form a service oriented control system. For example, an industrial process can be defined with a plurality of services 202, wherein one service is a control service, which controls an equipment service and a material service, wherein the material service is subordinate to the equipment service.

Generally, the service 202 is an association of one or more reusable definitions 208 with one or more specifications 210. Reusable definitions 208 can include program code that can alter a state of one or more resources in the industrial control environment. For example, the reusable definitions 208 can be at least one of logic code, including ladder logic, function chart, script, JAVA, C code, and the like. It is to be appreciated that a service 202 can support multiple reusable definitions 208 (e.g., to engage with multiple hosts 204). The one or more specifications 210 can include the one or more resources. The one or more resources can include one or more of equipment, material, personnel, segments, storage, and the like. For example, the resource may be a valve that is opened or closed according to logic code.

Similar to a plug-in approach in software, a service 202 can hide internal aspects (e.g., reusable definitions 208 and specifications 210) from a user. The service 202 can hide these aspects by providing standard and/or generic interfaces 206 to external systems. According to an embodiment, the interface 206 can allow the service 202 to expose external reference information about the service 202. For example, the external reference information can include information describing dependencies of the service 202, required connections to support the reusable definition 208, and the like. The service 202 can support multiple interfaces 206, which can allow the service 202 to engage with multiple hosts 204.

According to an embodiment, users and/or hosts 204 can access the services 202 across a network (not shown). The network may include, for example, any public or private network. For example, services 202 can be created in an offline manner, such as in a computer database (not shown). When created offline, the services 202 can be downloaded for execution on the hosts 204.

Figure 3:
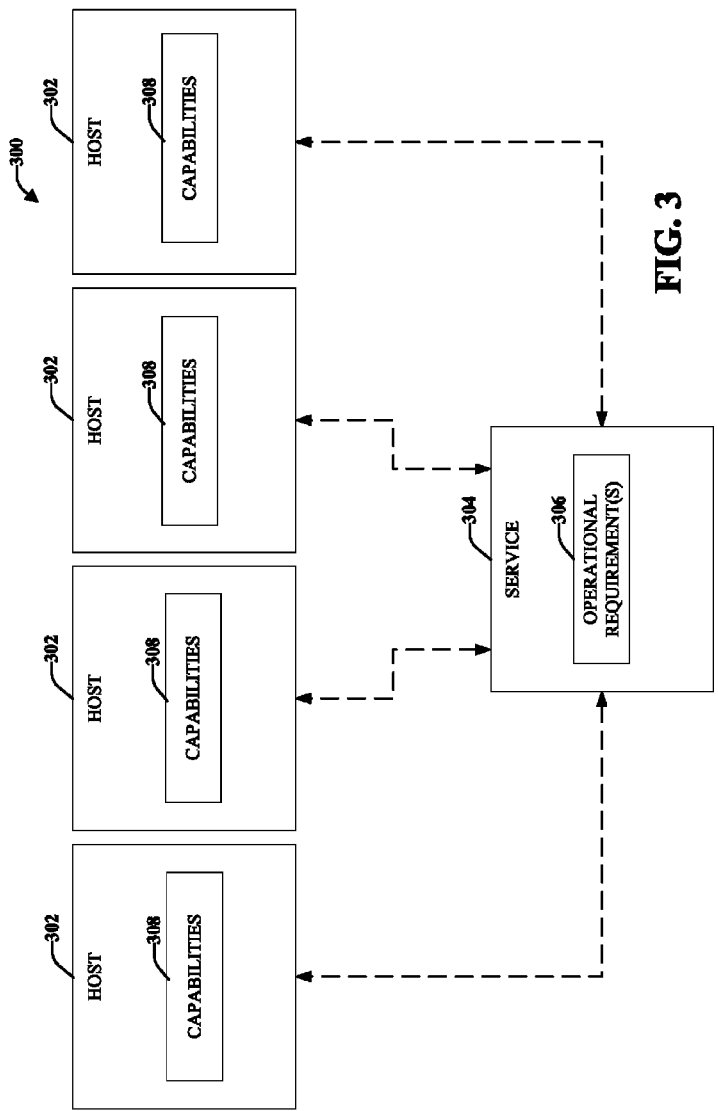
FIG. 3 is a block diagram illustrating a system for matching services and hosts.

FIG. 3 illustrates an example system 300 for expressing matching among hosts 302 and a service 304. The service 304 can have one or more operation requirements 306. For example, the operation requirements 306 can be that a host should have a high resolution size and a large memory. Hosts 302 can have different capabilities 308 that can be exploited by the service 304. A binding (represented with a dotted line) can be created with a host in an attempt to match one or more operational requirement 306 with one or more capabilities 308. If more than one host 302 includes one or more hosting capabilities 308 that match one or more operational requirements 306 of a service 304, then multiple bindings can be created and/or selection of a single host can occur and one binding can be used. If no host 302 has a capability 308 matching an operational requirement 306 of the service 304, then an error message can be generated. In accordance with some aspects, if there are no current hosts 302 that match an operational requirement 306, periodic or continuous observation of the environment can occur to detect when a new host 302 that has the required capability 308 enters the environment. The periodic or continuous monitoring can also occur to detect modifications to an existing host 302 to determine when the host 302 has been modified and now meets at least one operational requirement 306 of the service 304.

Figure 4:
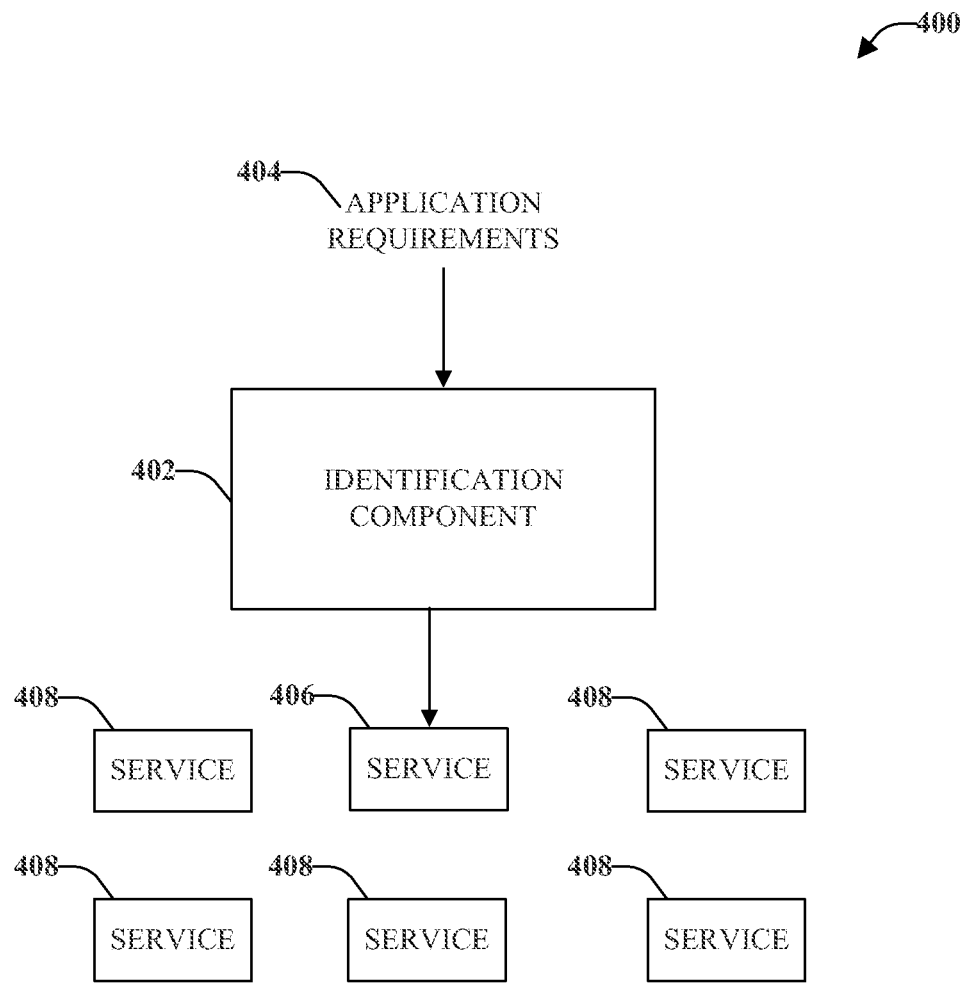
FIG. 4 is a block diagram illustrating a system for automatically constructing an application for an industrial automation system.

FIG. 4 illustrates an example system 400 for constructing an application for an industrial automation system. An identification component 402 can be configured to identify application requirements 404 for the application. According to an embodiment, the identification component 402 can be a component stored in memory and executed by a processor. Based, at least in part, on the application requirements 404, the identification component 402 can be configured to select and/or configure at least one service 406 for the application, where the service 406 can be employed as an executable function for the industrial automation system.

The identification component can be associated with a user interface (e.g., a graphical user interface) configured to receive an input related to the application. As defined above, a user can be at least one of a human or a machine within an industrial control system, or the like. This input can include information about application requirements 404.

For example, a user can provide a general description of the application to the identification component 402 (e.g., through an interface). The general description can include features of the application. The features of the application can be the application requirements 404. The identification component 402 can be configured to analyze the description of the application and determine one or more application requirements 404. In another example, a user can enter application requirements 404 directly; for example, into a form. Application requirements 404 can include, for example, steps of the industrial process, factory equipment used in the industrial process, or the like.

Based upon the application requirements 404, the identification component can select one or more services 406 that match at least one of the application requirements 404. The identification component 402 can select the one or more services 406 from a plurality of services 408. The plurality of services 408 can be stored in a data store, either remote from the identification component 402 or local to the identification component 402. The plurality of services 408 can be stored in a plurality of data stores located at remote locations.

According to an embodiment, information about the plurality of services 408 (e.g., from metadata) can be stored in a common location, even if the plurality of services 408 are stored in disparate data sources. The common location can be, for example, in a list, a database, or the like. The information can include, for example, operational requirements. The identification component 402 can consult the common location and determine which of the plurality of services 408 matches at least one application requirement 404. The identification component 402 can present the source 406 matching the at least one application requirement 404 to the user via an interface (e.g., a graphical user interface). According an embodiment, the identification component 402 can assemble the at least one service 406 matching at least one of the application requirements 404 to form the application.

Figure 5:
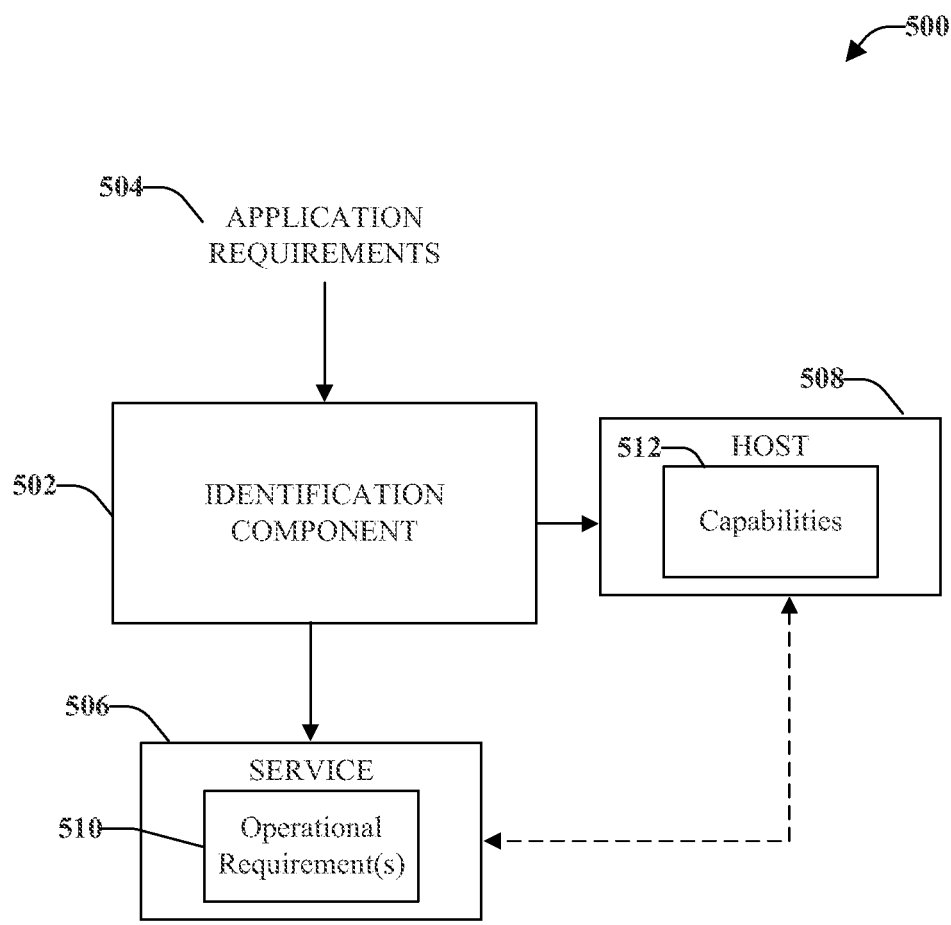
FIG. 5 is a block diagram illustrating a system for matching a host and a service for constructing an application for an industrial automation system.

FIG. 5 illustrates an example system 500 for constructing an application for an industrial automation system. The system 500 utilizes an identification component 502 that can be configured to receive a description of an application for an industrial automation system and automatically determine application requirements 504 for the application based, at least in part, on the description. The identification component 502 can automatically determine at least one service 506 and at least one host 508 that can host the at least one service 506. According to an embodiment, the identification can match and/or execute the at least one service 506 with the at least one host 508 by matching at least one operational requirement 510 of the at least one service 506 with at least one hosting capability 512 of the at least one host 508.

According to an aspect, the identification component 502 can maintain possible hosts 508 and provide some description of their respective capabilities 512. For example, the possible hosts 508 and the associated description of the capabilities 512 can be maintained in a list, a database, or the like. The capabilities 512 can include, for example, language of execution, resolution, color capability, touch-screen capability, memory capability, and the like. The identification component 502 can also maintain possible services 506 and provide some description of their respective operational requirements 510 or, in other words, operational requirements. Operational requirements 510 can include, for example, language of execution, resolution, color capability, touch-screen capability, memory capability, and the like. The identification component 502 can match a service 506, or parts thereof, with a host 508 based upon the operational requirements 510 of the service 506 and the capabilities 512 of the host 508. For example, the identification component 502 can receive an input related to an application and determine application requirements 504 associated with the application. According to the application requirements 504, the identification component can automatically identify at least one service 506 that can satisfy the application requirements 504. The identification component can determine any operational requirements 510 associated with the at least one service 506. According to the operational requirements 510, the identification component 502 can match the at least one service 506 to at least one host 508 with capabilities 512 matching the operational requirements 510. The identification component 502 can output, for example, a list of the services 506 that satisfy the application requirements 504 and the hosts 508 with capabilities 512 matching the operational requirements 510. The identification component 502 can present hosts 508 with capabilities 512 matching the operational requirements 510 as choices for the user. For example, the choices can be based upon location of the host 508, I/O points of the host, and/or timing of the service.

In another aspect, the identification component 502 can be configured to enforce rules and/policies across a hierarchy of the industrial automation system. For example, the identification component 502 can ensure that services 506 are not deployed to hosts 508 that are not within the hierarchy. For example, the identification component 502 can eliminate hosts 508 that do not belong in the hierarchy from the choices of potential hosts 508. The identification component 502 can be configured to facilitate deployment of a service 506 to a host 508 by automated queries. For example, the identification component 502 can monitor hosts 508 (e.g., control devices) within the industrial automation system and alert when a host 508 becomes available. When the host 508 becomes available, the identification component 502 can automatically identify a logical area hierarchy in order to provide suggestions about where to deploy the service 506. For example, the identification component can provide suggestions about available hosts 508 to deploy the service 506 that are within the hierarchy, ruling out hosts 508 that do not make sense in light of the hierarchy.

According to an embodiment, a user can input to the identification component 502 a description of an application. The identification component 502 can determine the application requirements 504 (e.g., features of the application). The identification component 502 can output (e.g., as a list) devices capable of hosting services 506 that can meet the application requirements 504. For example, the identification component 502 can find the at least one service 506 and/or the at least one host 508 in one or more catalogs and offer the at least one service 506 and/or the at least one host 508 for the user to purchase. For example, the identification component 502 can find a plurality of services 506 that can meet the application requirements 504. The identification component can then fund at least one device that can host the plurality of services 506. The identification component 502 can present these devices as potential hosts 508 to the user (e.g., in a list) so that the user can chose the device best suited to his needs (e.g., compatibility with other devices, price, manufacturer, and the like).

According to an embodiment, a user can purchase a host 508 (e.g., an industrial controller) from an online retailer. The identification component 502 can search a history of other users who have purchased the host 508 (e.g., search memory for information about past purchases) and suggest services 506 that other users have purchased with the host 508.

The user can input application requirements 504 and can also input information about a specific host 508 (e.g., controller, I/O device, server, and the like) and/or a specific control system. According to an embodiment, identification component 502 can determine whether the specific host 508 and/or control system can execute the application. For example, the identification component can automatically determine if the specific host 508 or the control system can execute one or more services 506 that meet the application requirements 504.

Additionally or alternatively, after a service 506 is downloaded to a host 508, the identification component 502 can configure a simulation of the application on the host 508. During the simulation, the identification component can also evaluate performance of the service 506 and the host 508. For example, the identification component 502 can estimate memory of the host 508 when executing the service 506 and/or the application. The identification component 502 can, additionally or alternatively, evaluate instructions for executing the service 506 and/or the application. Additionally or alternatively, the identification component 502 can estimate and/or describe means of application of the service 506 and/or the capabilities 512 of the host 508 and/or the operational requirements 510 of the service.

For example, the identification component 502 can simulate the application and determine how many hosts 508 are necessary to optimize the application. This determination can be based, at least in part, upon a performance calculation (e.g., timing) and/or a memory estimation. The identification component 502 can also determine the amount and/or the type of resources necessary for the application based, at least in part, upon the operational requirements 510 of the service. Based, at least in part, on the simulation, the identification component 502 can identify deficiencies in the application, the service 506 and/or the host 508 and suggest remedies for the deficiencies.

According to the simulation, the identification component 502 can identify services 506 to connect to form the application. In other words, the identification component 502 can determine which services 506 to execute together for a certain application. According to the simulation, the identification component 502 can determine how the application executes with the services 506. The services 506 can include external references that can have a plurality of specifications, allowing the services 506 to bind to a plurality of different types of components. For example, the plurality of different types of components can include components of a test system, components of a pilot system, components of a training system, components of a live system, and so forth. The services 506 can be executed by the same host 508 or different hosts 508. Different hosts 508 can be located in disparate locations connected by a network.

Figure 6:
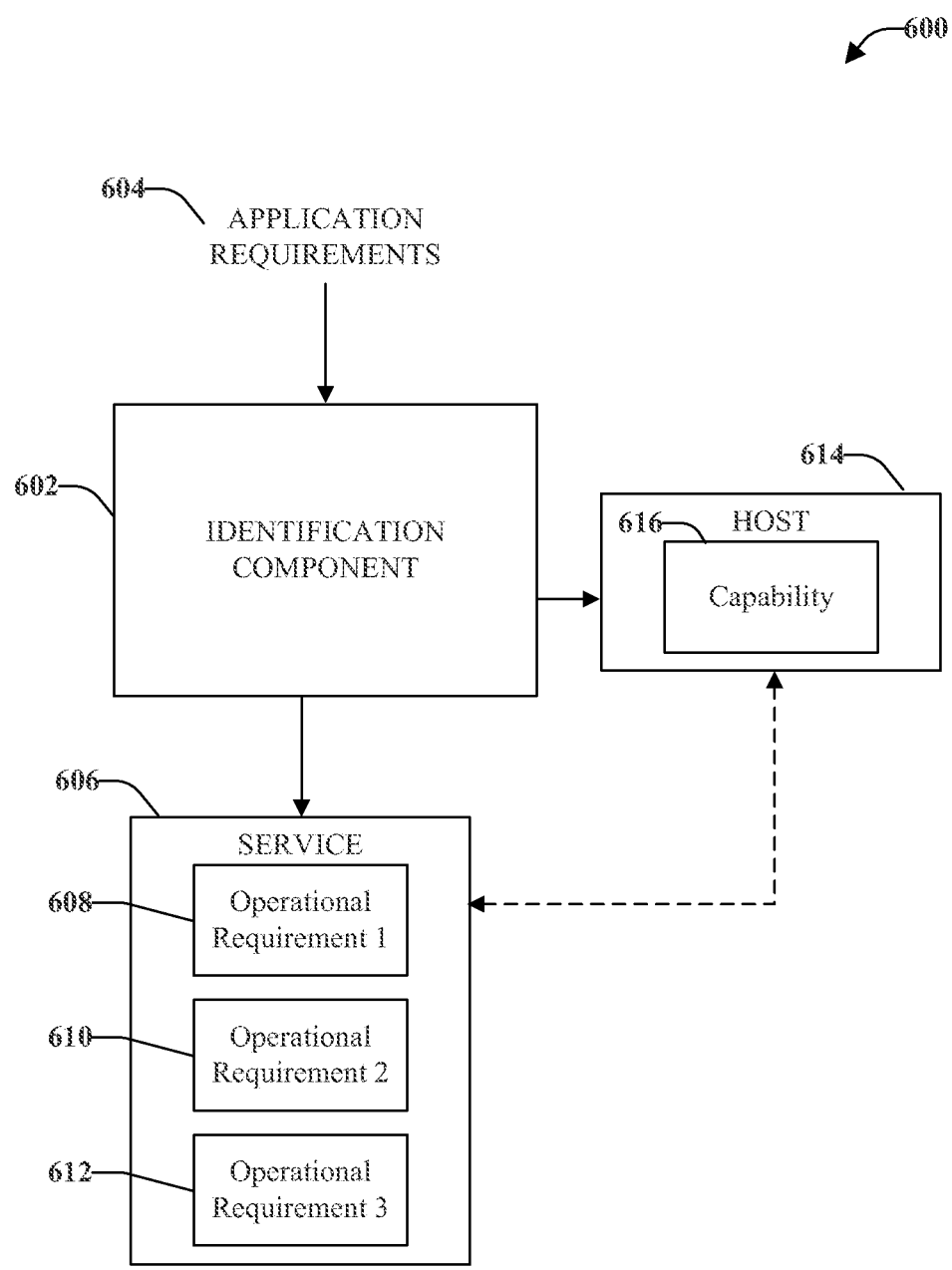
FIG. 6 is a block diagram illustrating a system for matching a host and a service according to operational requirements of the service.

FIG. 6 illustrates an example system 600 for constructing an application for an industrial automation system. The system 600 can include an identification component 602 that receives an input including at least one application requirement 604. The identification component can automatically determine the at least one application requirement 604 based upon the input. Based upon the at least one application requirement, the identification component search, for example, a memory or a list, for at least one service 606 matching the at least one application requirement. The at least one service 606 can include a plurality of operational requirements 608-612. Although only three operational requirements 608-612 are illustrated, it is to be understood that the service can any number of operational requirements. The identification component 602 can match the service to at least one of a plurality of hosts 614. The identification component 602 can match the at least one service 606 to the at least one host 614 by matching a capability 616 of the host with at least one operational requirement 608-612 of the service 606.

According to an aspect, the operational requirements 608-612 of the service 606 can correspond to implementations of the service. Different implementations of the service 606 can correspond to different levels of a hierarchical data model employed within an industrial automation environment (e.g., a first implementation can correspond to a first level and a second implementation can correspond to a second level). The operational requirements 608-612 can, additionally or alternatively, relate to different languages of execution. For example, a service can include a first operational requirement 608 corresponding to a first language of execution utilized by a first host and a second operational requirement 608 corresponding to a second language of execution utilized by a second host, and so on.

Different implementations of the service 606 can have different metadata indicating the operational requirements 608-612 of the service. The identification component 602 can be further configured to select a host 614 for the service 606 based on the metadata for the different implementations.

According to an aspect, the identification component 602 can be configured to select a host 614 most favorable to deploy the service 606 to from a plurality of hosts with different capabilities 616. For example, the identification component 602 can analyze the plurality of services and determine the host 614 most favorable for the service based at least in part upon a language of the execution and/or metadata related to the implementation of the service 606. Additionally or alternatively, the identification component can analyze the capabilities of the plurality of hosts and, for example, determine the fastest host or the host with the largest memory and offer this host 614 to the user to match with the service 606.

In view of exemplary systems shown and described above, methodologies that may be implemented in accordance with the disclosed subject matter, will be better appreciated with reference to various flow charts. While, for purposes of simplicity of explanation, methodologies are shown and described as a series of blocks, it is to be understood and appreciated that the various embodiments described herein are not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g. device, system, process, component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 7:
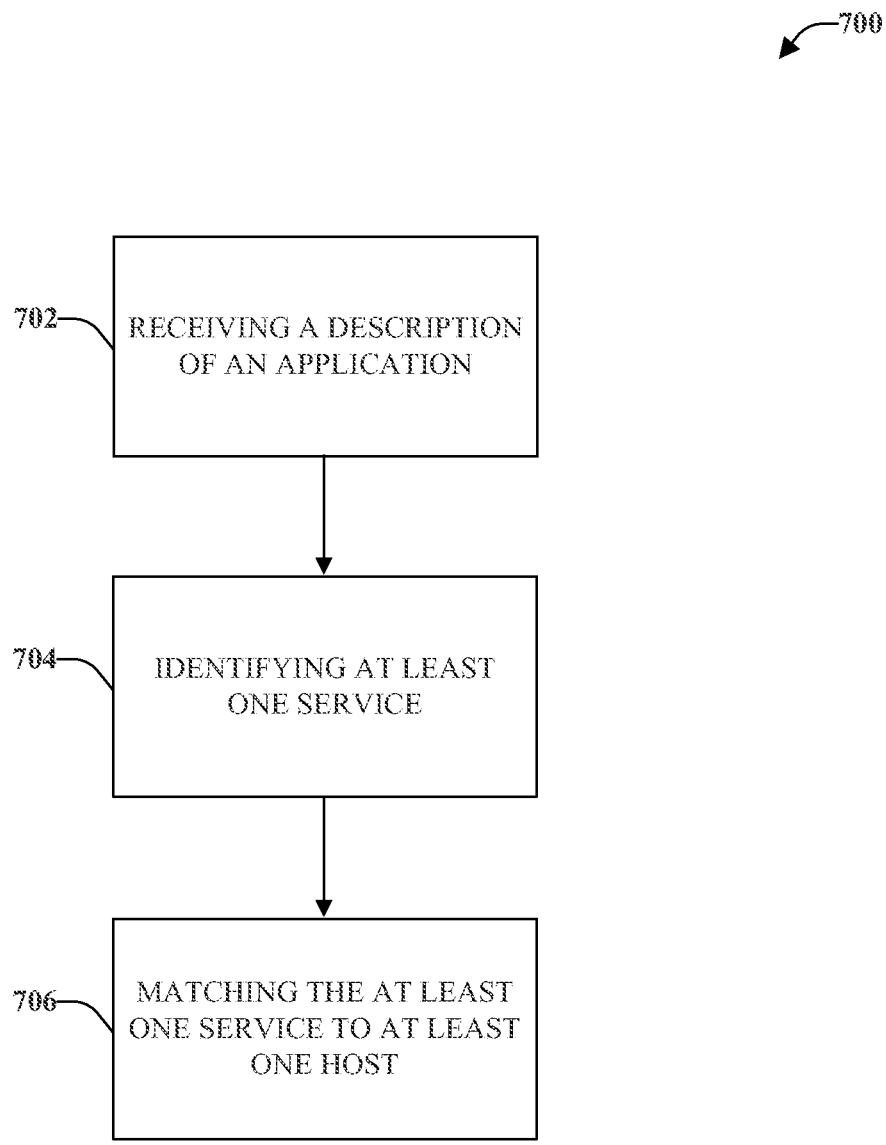
FIG. 7 is a process flow diagram for automatically constructing an application.

FIG. 7 illustrates a process 700 for constructing an application for an industrial automation system. At 702, a description of the application can be received (e.g., at an identification component stored in memory and executed by a processor). The description can be analyzed and features of the application can be identified. At 704, at least one of a plurality of services (e.g., stored in a data store or across a plurality of data stores) can be identified that meet at least one feature of the application. The at least one of the plurality of services can include a plurality of operational requirements. The operational requirements can, for example, relate to an execution language, a resolution size, and/or a memory size. At 706, the at least one service can be matched to at least one of a plurality of hosts. The at least one of the plurality of hosts can include at least one capability, and the at least one of the plurality of hosts is matched to the at least one service if the at least one capability matches at least one of the plurality of operational requirements.

Figure 8:
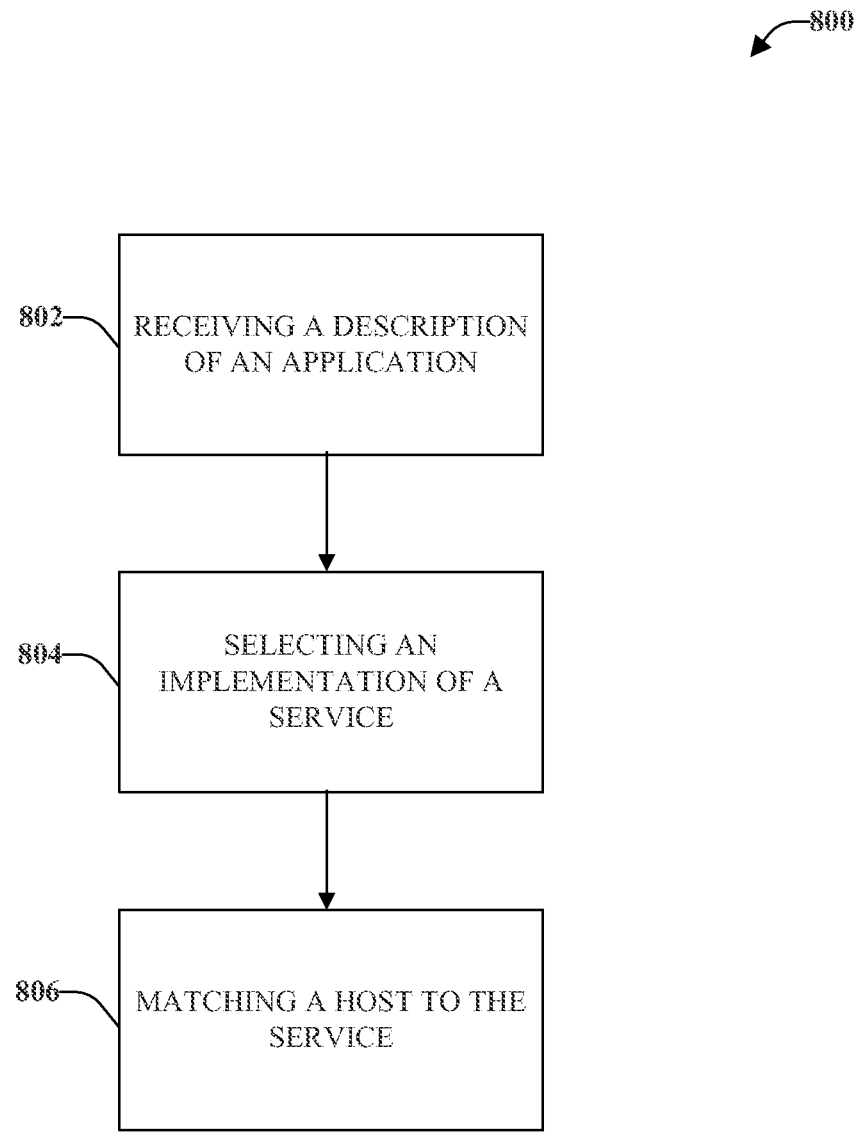
FIG. 8 is a process flow diagram for automatically matching an implementation of a service with a host for automatically constructing an application.

FIG. 8 illustrates a process 800 for constructing an application for an industrial automation environment based upon different implementations of a service. At 802, a description of the application can be received (e.g., at an identification component stored in memory and executed by a processor). The description can be analyzed and features of the application can be identified.

At 804, an implementation of a service can be selected, based at least in part on the features. A service can have a plurality of implementations, for example, corresponding to a plurality of operational requirements. For example, a service can include a first implementation requirement that can be based on a first execution language and a second implementation that can be based on a second execution language. Additionally or alternatively, the implementations can correspond to levels of a hierarchical data model employed within the industrial automation environment. Additionally or alternatively, the implementations can have different metadata for each implementation describing operational requirements for each implementation. At 806, a host that matches the implementation can be selected based on at least one capability of the host.

Figure 9:
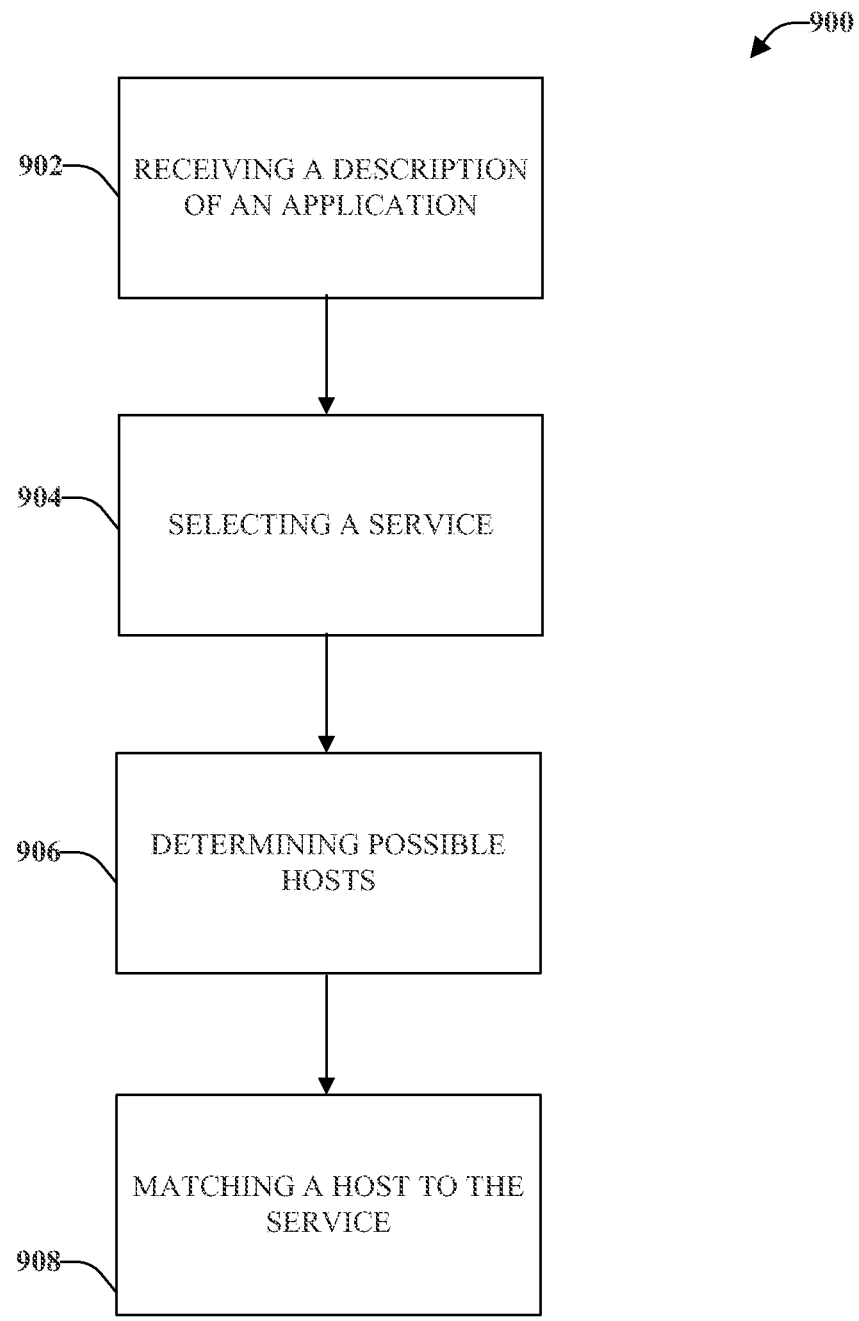
FIG. 9 is a process flow diagram for selecting a host to match a service.

FIG. 9 illustrates a process for selecting a host for a service to construct an application in an industrial automation environment. At 902, a description of the application can be received (e.g., at an identification component stored in memory and executed by a processor). The description can be analyzed and features of the application can be identified. At 904, a service and/or an implementation of a service can be selected, based at least in part on the features.

At 906, possible hosts with at least one capability matching at least one operational requirement of the service and/or the implementation can be determined. According to an embodiment, the possible hosts can be output (e.g., in a list) and a user can choose the host to match the service and/or the implementation.

At 908, a host is automatically matched to the service and/or the implementation according to a ranking of capabilities. For example, the service may have an execution language operational requirement. Three hosts can be found to match the execution language operational requirement. The three hosts can be ranked according to another capability (e.g., resolution size). The host with the highest resolution size can be chosen to match the service. This ranking can be based upon any capability of the hosts. Additionally or alternatively, the ranking can be repeated for different capabilities. For example, if two of the three hosts are determined to have the same resolution size, the two hosts can be ranked according to another capability (e.g., memory). The highest ranking host can be matched to the service.

Figure 10:
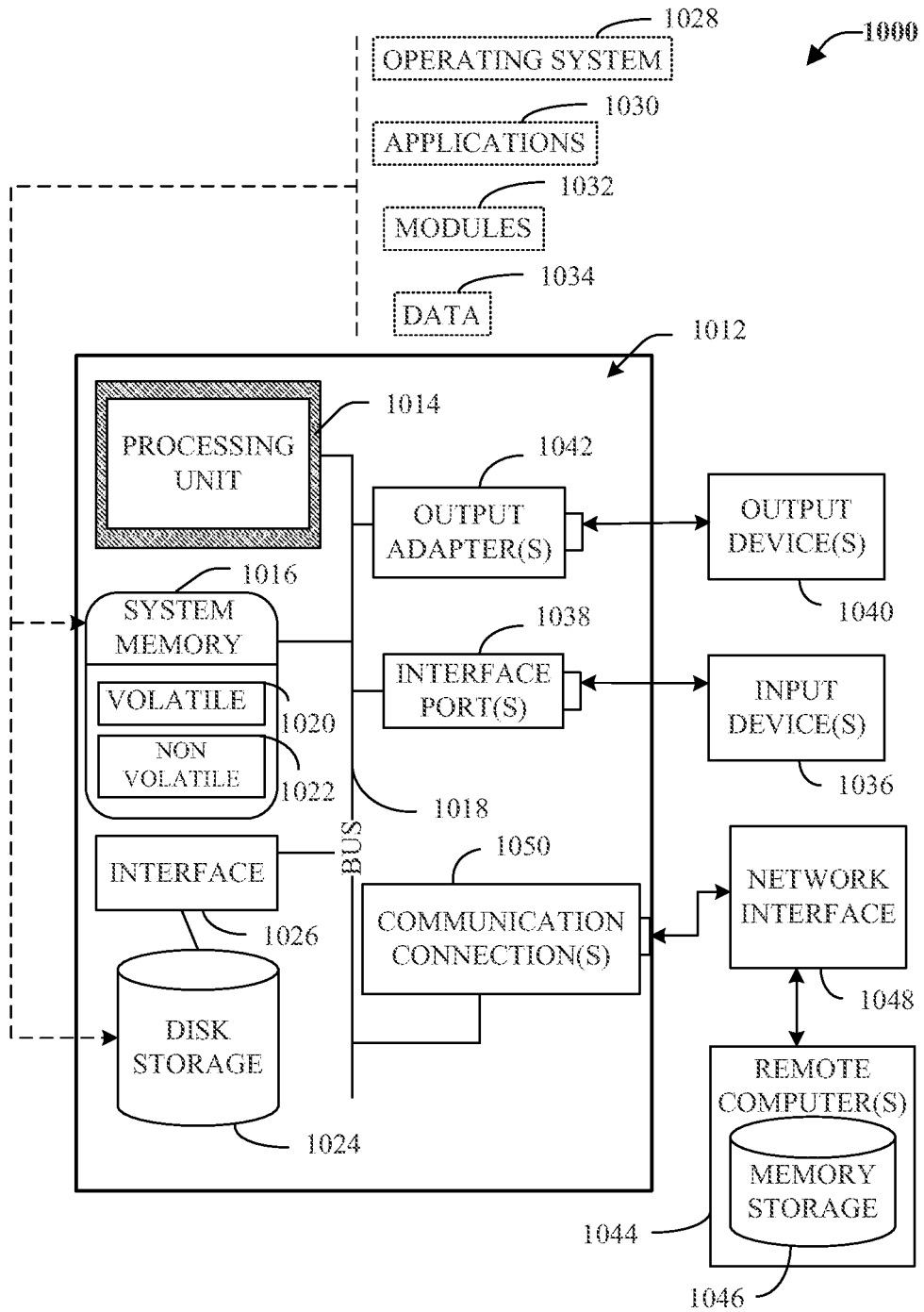
FIG. 10 is a block diagram of a computer operable to execute the disclosed aspects.

Referring now to FIG. 10, there is illustrated a block diagram of a computer operable to execute the disclosed system. In order to provide additional context for various aspects thereof, FIG. 10 and the following discussion are intended to provide a brief, general description of a suitable computing environment 1000 in which the various aspects of the embodiment(s) can be implemented. While the description above is in the general context of computer-executable instructions that may run on one or more computers, those skilled in the art will recognize that the various embodiments can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments may also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the illustrative environment 1000 for implementing various aspects includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a nonvolatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1094 interface technologies. Other external drive connection technologies are within contemplation of the various embodiments described herein.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the illustrative operating environment, and further, that any such media may contain computer-executable instructions for performing the methods of the disclosed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1094 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adaptor 1056 may facilitate wired or wireless communication to the LAN 1052, which may also include a wireless access point disposed thereon for communicating with the wireless adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are illustrative and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet without wires. Wi-Fi is a wireless technology similar to that used in a cellular phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

Figure 11:
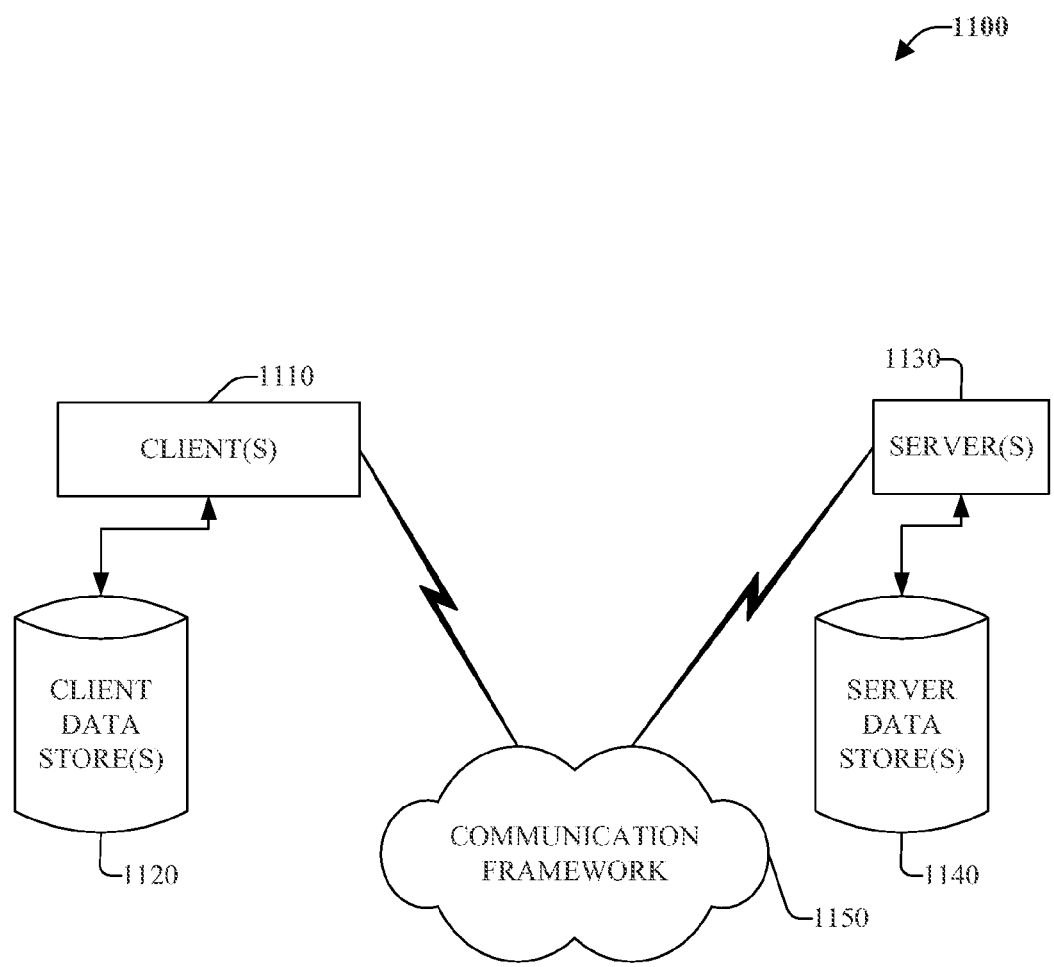
FIG. 11 is a schematic block diagram of an exemplary computing environment, according to an aspect.

Referring now to FIG. 11, there is illustrated a schematic block diagram of an illustrative computing environment 1100 for processing the disclosed architecture in accordance with another aspect. The system 1100 includes one or more client(s) 1102. The client(s) 1102 can be hardware and/or software (e.g., threads, processes, computing devices). The client(s) 1102 can house cookie(s) and/or associated contextual information in connection with the various embodiments, for example.

The system 1100 also includes one or more server(s) 1104. The server(s) 1104 can also be hardware and/or software (e.g., threads, processes, computing devices). The servers 1104 can house threads to perform transformations in connection with the various embodiments, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

It is noted that as used in this application, terms such as "component," "module," "system," and the like are intended to refer to a computer-related, electro-mechanical entity or both, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process or thread of execution and a component may be localized on one computer or distributed between two or more computers, industrial controllers, or modules communicating therewith.

The subject matter as described above includes various exemplary aspects. However, it should be appreciated that it is not possible to describe every conceivable component or methodology for purposes of describing these aspects. One of ordinary skill in the art may recognize that further combinations or permutations may be possible. Various methodologies or architectures may be employed to implement the subject invention, modifications, variations, or equivalents thereof. Accordingly, all such implementations of the aspects described herein are intended to embrace the scope and spirit of subject claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus, comprising:
   a processor; and
   a memory that stores executable instructions that, when executed by the processor facilitate performance of operations, comprising:
      selecting a service from a plurality of services that satisfies a requirement of an application represented in a received description, the service is a reusable template that exposes functionality of components in an industrial automation environment and conceals details of interaction with the components and comprises a first operational requirement comprising a first programming language requirement and a second operational requirement comprising a second programming language requirement different from the first programming language requirement, and wherein the description defines the application to be used in the industrial automation environment;
      determining a first host comprising a first capability satisfies the first operational requirement of the service; and
      determining a second host comprising a second capability satisfies the second operational requirement of the service to the service.

2. The apparatus of claim 1, wherein the first operational requirement corresponds to a first level of a hierarchical data model employed within the industrial automation environment and the second operational requirement corresponds to a second level of the hierarchical data model employed within the industrial automation environment.

3. The apparatus of claim 1, wherein the operations further comprise deploying, by the first host, the service comprising facilitating execution of the application within a first platform based on the first operational requirement.

4. The apparatus of claim 1, wherein the operations further comprise receiving a selection of the first host from a displayed list of a plurality of hosts.

5. The apparatus of claim 1, wherein the operations further comprise determining the first host matches the service based on a language requirement of an implementation of the service that facilitates execution of the application.

6. The apparatus of claim 1, wherein the operations further comprise determining the first host based on metadata related to an implementation of the service that describes the first operational requirement of the service.

7. The apparatus of claim 1, wherein the operations further comprise determining the first host based on an analysis of the first capability.

8. A method, comprising:
   identifying, by a system comprising a processor, a service from a plurality of services based on a determination that the service maps to a feature of an industrial automation environment, wherein an external function of the service is hidden from a user and the plurality of services are stored in a memory of the system, and wherein the feature is an application requirement;
   determining, by the system, a first host, comprising a first capability, satisfies a first operational requirement of the service;
   determining, by the system, a second host, comprising a second capability, satisfies a second operational requirement of the service; and
   facilitating execution, by the system, of the service by the first host or the second host.

9. The method of claim 8, further comprising:
   facilitating, by the system, a first implementation of the service with the first operational requirement; and
   facilitating, by the system, a second implementation of the service with the second operational requirement, wherein the first implementation corresponds to a first level of a hierarchical data model employed within the industrial automation environment and the second implementation corresponds to a second level of the hierarchical data model employed within the industrial automation environment.

10. The method of claim 8, further comprising deploying a first implementation comprising the first host matched to the service or a second implementation comprising the second host matched to the service to a platform within the industrial automation environment.

11. The method of claim 8, wherein the first operational requirement comprises a first programming language and the second operational requirement comprises a second programming language different from the first programming language.

12. The method of claim 8, further comprising receiving, by the system, a selection of the first host from a list of a plurality of hosts based on the first capability.

13. The method of claim 8, wherein the determining the first host further comprises selecting the first host based on a communication language requirement of the first operational requirement of the service.

14. The method of claim 8, wherein the determining the first host further comprises selecting the first host based on metadata related to the first operational requirement of the service.

15. The method of claim 8, wherein the determining the first host further comprises selecting the first host based on an analysis of the first capability with respect to the first operational requirement of the service.

16. A system, comprising:
   a memory that stores executable instructions; and
   a processor that facilitates execution of the executable instructions to at least:
      identify a service for a set of services stored in the memory, the service corresponds to a feature of an application in an industrial automation environment, wherein the service is configured to expose an external interface and hide an internal interface, a message, and a programming code;

determine a first host comprising a first capability satisfies a first operational requirement of the service; and determine a second host comprising a second capability satisfies a second operational requirement of the service.

17. The system of claim 16, wherein the processor further facilitates execution of the computer executable instructions to select the first host from a plurality of hosts based on the first operational requirement of the service.

18. The system of claim 16, wherein the service comprises a first implementation comprising the first operational requirement and a second implementation comprising the second operational requirement different than the first operational requirement.

19. The system of claim 16, wherein the processor further facilitates the execution of the computer executable instructions to display a list of a plurality of hosts, the plurality of hosts comprising the first host and the second host.

20. The system of claim 19, wherein the processor further facilitates the execution of the computer executable instructions to receive a selection of the first host based on the first capability or the second host based on the second capability.

* * * * *